(12) United States Patent
Morimoto

(10) Patent No.: US 7,896,638 B2
(45) Date of Patent: Mar. 1, 2011

(54) MIXING AND PULVERIZING DEVICE, MELTING METHOD FOR MIXING, AND METHOD OF MOLDING CELLULOSE MATERIAL IMPREGNATED WITH BINDER

(75) Inventor: Masachika Morimoto, Aichi (JP)

(73) Assignee: M & F Technology Co., Ltd., Aichi-gun (JP)

( * ) Notice: Subject to any disclaimer, the term of this patent is extended or adjusted under 35 U.S.C. 154(b) by 1167 days.

(21) Appl. No.: 10/547,076

(22) PCT Filed: Feb. 27, 2004

(86) PCT No.: PCT/JP2004/002347
§ 371 (c)(1),
(2), (4) Date: May 11, 2006

(87) PCT Pub. No.: WO2004/076044
PCT Pub. Date: Sep. 10, 2004

(65) Prior Publication Data
US 2007/0003654 A1   Jan. 4, 2007

(30) Foreign Application Priority Data
Feb. 27, 2003   (JP) ................... 2003-052012

(51) Int. Cl.
*B29C 47/36* (2006.01)
*B01F 7/04* (2006.01)
(52) U.S. Cl. ......... 425/209; 425/203; 425/205; 425/812; 425/DIG. 22; 366/75; 366/76.3; 366/189; 366/327.3
(58) Field of Classification Search ............ 366/325.92, 366/189, 138, 97, 99, 76.3, 76.1, 75, 76.2, 366/81, 98, 292; 425/203, 204, 205, 209; 277/543, 546, 552
See application file for complete search history.

(56) References Cited

U.S. PATENT DOCUMENTS

| | | | | | |
|---|---|---|---|---|---|
| 1,626,675 | A | * | 5/1927 | Hanley, Jr. | 366/91 |
| 2,614,417 | A | * | 10/1952 | Cockrell et al. | 73/862.193 |
| 3,266,738 | A | * | 8/1966 | August et al. | 241/98 |
| 3,332,368 | A | | 7/1967 | Stickelber | |
| 3,591,146 | A | | 7/1971 | Sutter | |
| 3,831,290 | A | * | 8/1974 | Gomez et al. | 34/386 |
| 4,183,676 | A | | 1/1980 | Engels et al. | |

(Continued)

FOREIGN PATENT DOCUMENTS

DE   24 37 784 A1   2/1976

(Continued)

*Primary Examiner* — Richard Crispino
*Assistant Examiner* — William P Bell
(74) *Attorney, Agent, or Firm* — Oblon, Spivak, McClelland, Maier & Neustadt, L.L.P.

(57) ABSTRACT

A crushing and mixing device includes a mixing vessel in which a plurality of blades installed on a rotary shaft which is rotated by a motor as a driving source and freely rotatably supported, to mix and crush materials. A spiral vane is equipped to supply the materials which are introduced to a rotary shaft corresponding to an inlet from materials, to the mixing vessel; at least two blades are installed on the rotary shaft at an inclined angle; an outlet disposed at a side of a wall of the mixing vessel; the materials are mixed and crushed in the mixing vessel, and an entrained moisture therein is dewatered by the heat generated by actions of shearing, friction and compression; and a molten binder is impregnated in the dehydrated materials.

15 Claims, 7 Drawing Sheets

U.S. PATENT DOCUMENTS

| | | | |
|---|---|---|---|
| 4,589,215 A | | 5/1986 | Iwasaki et al. |
| 4,878,880 A | * | 11/1989 | Williams ........................ 464/37 |
| 5,358,328 A | | 10/1994 | Inoue et al. |

FOREIGN PATENT DOCUMENTS

| | | | |
|---|---|---|---|
| EP | 0 046 569 A2 | | 3/1982 |
| JP | 37-10980 | | 8/1962 |
| JP | 10-151332 | | 6/1998 |
| JP | 10-151629 | | 6/1998 |
| JP | 10151332 A | * | 6/1998 |
| JP | 11-226956 | | 8/1999 |
| JP | 2000-343529 A | | 12/2000 |
| JP | 2000-351113 A | | 12/2000 |
| JP | 3839882 B2 | | 8/2006 |
| JP | 3857758 | | 9/2006 |

* cited by examiner (A)

(B)

(A)

(B)

MIXING AND PULVERIZING DEVICE, MELTING METHOD FOR MIXING, AND METHOD OF MOLDING CELLULOSE MATERIAL IMPREGNATED WITH BINDER

TECHNICAL FIELD

The present invention relates to crushing and mixing devices, and mixing and melting methods and methods for molding cellulose-based materials impregnated with molten binders, for utilizing or reusing cellulose-based materials, i.e. woody materials and plant materials, or woody waste materials and plant-waste materials, at a high ratio.

BACKGROUND ART

As a method to provide an attractive appearance for synthetic resins, a method for kneading powder of woods in synthetic resins has been applied; however, since the compatibility between synthetic resins and woods is generally poor, the filling rate of wood in most commercial molding materials filled with wood powder currently remains slightly exceeding 50% by weight.

The conventional methods for producing molding materials filled with wood powder are called a simple mixing method, and composed of the following steps; employing powder of wood such as cedar, white cedar, pine and the like of which the water content is equal to or less than 12% after being subjected to an artificial drying processing and of which the grain size is approximately 150 µm, introducing such wood powder in an amount of 50% by weight into a mixing and melting device heated at approximately 160° C. by heated steam or oil, drying for approximately 20 minutes by rotating mixing blades to reduce the water content to be equal to or less than 0.3%; adding, thereafter, a binder of thermoplastic resins (such as PPs, PEs or biodegradable resins), a compatibility accelerator (such as reactive polyolefin-based oligomers or maleic anhydride) and the like in an amount of 50% by weight, followed by simply mixing for approximately 20 minutes by rotating the mixing blades. Then, a mixture formed in a gel state is introduced to a cooler (cooling water: 20° C., flow rate: 100 L/minute) to be cooled and pelletized by rotating the blades for approximately 15 minutes.

Any of the conventional methods employ commercial wood powder, and individually apply a drying step, mixing and melting step, and pelletizing step in their production. These methods are not concerned with water content of materials employed; if the materials are being chipped, they do not combine all steps of pulverizing, drying, melting and mixing, and pelletizing, into one step (only with one mixing and melting device); are also impossible to carry out within a short thermal history; release an environmental load in reusing wasted materials, and have problems with production costs and productivity.

The present invention also provides methods for utilizing or reusing materials which are problematic for conventional methods in terms of cost and productivity, the materials such as chipped woody waste materials or woody waste materials like pruned branches and leaves of trees, plant materials and plant-waste materials like stems and leaves of wheat; and enhances utilization of wasted materials and promotes reuse thereof by improving the filling ratio.

DISCLOSURE OF THE INVENTION

The present inventor has conceived a first technical idea of the present invention such that, in a crushing and mixing device having a mixing vessel in which a plurality of blades are installed on a rotary shaft which is being rotated by a driving source and freely rotatably supported, to mix and crush materials, a spiral vane is equipped to supply the materials which are being introduced to a rotary shaft corresponding to an inlet for materials, to the mixing vessel; the plurality of blades are constituted by at least two blades which are installed on the rotary shaft in an arrangement opposing each other in the axial direction of the rotary shaft on a site spaced at a predetermined angle in the circumferential direction thereof as well as being inclined at an angle which reduces each other's opposing space in the rotating direction thereof; the inclined angle of the blades to the rotary shaft is unchanged between a base of the blade affixed on the rotary shaft and a tip of its radial direction; an outlet is disposed at a side of a wall of the mixing vessel to take out the materials mixed and crushed in the mixing vessel; and the woody materials and/or plant materials and the binder are mixed and crushed in the mixing vessel, and the molten binders are impregnated in the woody materials and/or plant materials in which an entrained moisture therein is dewatered by the heat generated by actions of shearing, friction and compression.

And the present inventor has conceived a second technical idea of the present invention such that, in a mixing and melting method for mixing and crushing a cellulose-based material in a mixing vessel by a means of a plurality of blades installed on a rotary shaft which is being rotated by a driving source, a chipped cellulose-based material and a binder which is introduced from an inlet for materials, are mixed and crushed by at least two blades which are installed on the rotary shaft in an arrangement opposing each other in the axial direction of the rotary shaft on a site spaced at a predetermined angle in the circumferential direction thereof as well as being inclined at an angle which reduces each other's opposing space in the rotating direction thereof; a molten binder is impregnated in the cellulose-based material of which the entrained moisture therein is dewatered by the heat generated by shearing, friction and compression of the cellulose-based material in the mixing vessel; and the cellulose-based material is taken out from the mixing vessel after impregnation of the molten binder to the cellulose-based material has finished.

The present invention can process materials without being concerned with regard to the water content thereof, and, if the materials are being chipped or split, in steps of pulverizing, drying, draining and mixing, and pelletizing by one step (only with one mixing and melting device) within a short thermal history, there is little environmental load in reusing the wasted materials. It is an object of the present invention to solve problems with production costs and productivity.

The present invention can process cellulose-based materials without being concerned with regard to the water content thereof, and, if the materials are being chipped or split, in steps of pulverizing, drying, melting and mixing, and pelletizing by one step (only with one mixing and melting device) within a short thermal history, there is little environmental load in using or reusing the materials; wherein such cellulose-based materials include woody materials and woody waste materials, and plant materials and plant-waste materials; the woody materials and woody waste materials include, for example, pruned branches and leaves of trees planted as shade trees such as horse chestnut, ginkgo trees, Chinese parasol, cherry tree, willow and poplar; pruned branches and leaves of cedar, white cedar, pine and Japanese larch; thinned woods of cedar, white cedar, pine and Japanese larch; barks of cedar, white cedar, pine and Japanese larch; chips and sawdust of cedar, white cedar and pine which are by-produced in lumber-mills; and laminated woods; and the plant materials and plant-waste materials include, for example, stems and leaves of wheat, used tea leaves and chaffs.

The present invention (the first invention described in Claim 1) provides a crushing and mixing device having a mixing vessel in which a plurality of blades are installed on a rotary shaft which is being rotated by a driving source and freely rotatably supported, to mix and crush materials; wherein a spiral vane is equipped to supply the materials which are being introduced to a rotary shaft corresponding to an inlet for materials, to the mixing vessel; the plurality of blades are constituted by at least two blades which are installed on the rotary shaft in an arrangement opposing each other in the axial direction of the rotary shaft on a site spaced at a predetermined angle in the circumferential direction thereof as well as being inclined at an angle which reduces each other's opposing space in the rotating direction thereof; the inclined angle of the blades to the rotary shaft is unchanged between a base of the blade affixed on the rotary shaft and a tip of its radial direction; an outlet is disposed at a side of a wall of the mixing vessel to take out the materials mixed and crushed in the mixing vessel; and the materials are mixed and crushed in the mixing vessel, and the entrained moisture therein is dewatered by the heat generated by actions of shearing, friction and compression.

The present invention (the second invention described in Claim 2) according to the first invention provides a crushing and mixing device in which the blade comprises a rectangular flat plate member.

The present invention (the third invention described in Claim 3) according to the second invention provides a crushing and mixing device in which the driving source comprises a motor which is connected to the rotary shaft via a means comprising belts or others to transmit rotation thereof.

The present invention (the fourth invention described in Claim 4) according to the third invention provides a crushing and mixing device in which the device has a cooling device which supplies a cooling medium from one end of the rotary shaft to the opposite end thereof, and circulates the cooling medium in a wall of the mixing vessel.

The present invention (the fifth invention described in Claim 5) according to the fourth invention provides a crushing and mixing device in which the device comprises grooves which are formed at support members that support the both ends of the rotary shaft, to communicate respective both ends of the shaft support members in the axial direction, and are constituted to enable to drain components derived from dehydration due to the heat generated by shearing, friction and compression of the materials in the mixing vessel.

The present invention (the sixth invention described in Claim 6) according to the fifth invention provides a crushing and mixing device in which the device has an opening/closing controlling unit to control an opening/closing member disposed at the outlet of the mixing vessel for taking out the mixed and crushed materials, wherein the unit controls opening or closing of the member based on a variation of a torque load which acts on a spindle of the motor and alters depending on the state of the materials which are being mixed, crushed and dried in the mixing vessel.

The present invention (the seventh invention described in Claim 7) provides a mixing and melting method for mixing and crushing a cellulose-based material in a mixing vessel by a means of a plurality of blades installed on a rotary shaft which is being rotated by a driving source; in which a chipped cellulose-based material and a binder which is introduced from an inlet for materials, are mixed and crushed by at least two blades which are installed on the rotary shaft in an arrangement opposing each other in the axial direction of the rotary shaft on a site spaced at a predetermined angle in the circumferential direction thereof as well as being inclined at an angle which reduces each other's opposing space in the rotating direction thereof; a molten binder is impregnated in the cellulose-based material of which the entrained moisture therein is dewatered by the heat generated by shearing, friction and compression of the cellulose-based material in the mixing vessel; and the cellulose-based material is taken out from the mixing vessel after impregnation of the molten binder to the cellulose-based material has finished.

The present invention (the eighth invention described in Claim 8) according to the seventh invention provides a mixing and melting method in which the cellulose-based material comprises a woody material and/or a plant material.

The present invention (the ninth invention described in Claim 9) according to the eighth invention provides a mixing and melting method in which the woody material and/or plant material are respectively a woody waste material and/or a plant-waste material.

The present invention (the tenth invention described in Claim 10) according to the ninth invention provides a mixing and melting method in which the rotary shaft is rotated by a motor working as the driving source, with a peripheral velocity of 5 to 50 meters per second at the tip of the blades.

The present invention (the eleventh invention described in Claim 11) according to the tenth invention provides a mixing and melting method in which the motor and the rotary shaft are connected not to follow rapid transitional change of rotation.

The present invention (the twelfth invention described in Claim 12) according to the eleventh invention provides a mixing and melting method in which a variation of torque load acting on the spindle of the motor is monitored.

The present invention (the thirteenth invention described in Claim 13) according to the twelfth invention provides a mixing and melting method in which, when the monitored torque load acting on the spindle of the motor has shifted from rising to reach a maximum value thereof, turning down to reach a minimum value thereof depending on the states of materials which are being mixed, crushed and dried in the mixing vessel, and then a predetermined time has passed after the monitored torque load reaching the minimum value thereof, the cellulose-based material which is being mixed, crushed, dehydrated and impregnated with the binder, is taken out from the outlet of the mixing vessel.

The present invention (the fourteenth invention described in Claim 14) provides a method for molding a cellulose-based material impregnated with a molten binder; in which a chipped cellulose-based material and a binder which are being introduced from an inlet for materials, are mixed and crushed by at least two blades installed on a rotary shaft which are situated in the mixing vessel and rotated by a driving source, in an arrangement opposing each other in the axial direction of the rotary shaft on a site spaced at a predetermined angle in the circumferential direction thereof as well as being inclined at an angle which reduces each other's opposing space in the rotating direction thereof; a molten binder is impregnated in the cellulose-based material of which the entrained moisture therein is dewatered by the heat generated by shearing, friction and compression of the cellulose-based material in the mixing vessel; the cellulose-based material is taken out from the mixing vessel after impregnation of the molten binder to the cellulose-based material has finished; and the cellulose-based material impregnated with the molten is taken out from the mixing vessel, and then is molded by heating and pressing.

The present invention (the fifteenth invention described in Claim 15) according to the fourteenth invention provides a method for molding a cellulose-based material impregnated with a molten binder in which molding for the cellulose-based material impregnated with the molten binder, is carried out by extrusion molding.

The present invention (the sixteenth invention described in Claim 16) according to the fifteenth invention provides a method for molding a cellulose-based material impregnated with a molten binder in which the cellulose-based material is a woody waste material and/or a plant-waste material.

In the crushing and mixing device of the first invention having the above-described construction, having the mixing vessel in which the plurality of blades are installed on the rotary shaft which is being rotated by the driving source and freely rotatably supported, to mix and crush materials, the spiral vane is equipped to supply the materials which are being introduced to the rotary shaft corresponding to the inlet for materials, to the mixing vessel, the plurality of blades are constituted by at least two blades which are installed on the rotary shaft in the arrangement opposing each other in the axial direction of the rotary shaft on the site spaced at the predetermined angle in the circumferential direction thereof as well as being inclined at the angle which reduces each other's opposing space in the rotating direction thereof, the inclined angle of the blades to the rotary shaft is unchanged between the base of the blade affixed on the rotary shaft and the tip of its radial direction, the outlet is disposed at the side of the wall of the mixing vessel to take out the materials mixed and crushed in the mixing vessel, and the materials are mixed and crushed in the mixing vessel, and the entrained moisture therein is dewatered by the heat generated by actions of shearing, friction and compression. Therefore the crushing and mixing device of the present invention accomplishes the effect that without concerning with water content of materials employed; if the materials are being chipped, all steps of pulverizing, drying, melting and mixing, and palletizing are also possible to carry out within a short thermal history, into one step (only with one mixing and melting device); an environmental load in reusing wasted materials is released, and problems with production costs and productivity are solved.

In the crushing and mixing device of the second invention having the above-described construction according to the first invention, the blade comprises the rectangular flat plate member.
Therefore the crushing and mixing device of the present invention has accomplished crushing and mixing the materials and eliminating the water contained therein with its simple construction. It gains easy maintenance and long life.

In the crushing and mixing device of the third invention having the above-described construction according to the second invention, the driving source comprises the motor which is connected to the rotary shaft via the means comprising belts or others to transmit rotation thereof. Therefore it obtains high flexibility in providing the motor comprising the driving sources.

In the crushing and mixing device of the fourth invention having the above-described construction according to the third invention, the device has the cooling device which supplies the cooling medium from one end of the rotary shaft to the opposite end thereof, and circulates the cooling medium in the wall of the mixing vessel. Therefore the crushing and mixing device of the present invention restrains the temperature rising on the rotary shaft and on the wall of the mixing vessel by cooling.

In the crushing and mixing device of the fifth invention having the above-described construction according to the fourth invention, the device comprises grooves which are formed at support members that support the both ends of the rotary shaft, to communicate respective both ends of the shaft support members in the axial direction, and are constituted to enable to drain components derived from dehydration due to the heat generated by shearing, friction and compression of the materials in the mixing vessel.

In the crushing and mixing device of the sixth invention having the above-described construction according to the fifth invention, the device has the opening/closing controlling unit to control the opening/closing member disposed at the outlet of the mixing vessel for taking out the mixed and crushed materials, wherein the unit controls opening or closing of the member based on a variation of the torque load which acts on the spindle of the motor and alters depending on the state of the materials which are being mixed, crushed and dried in the mixing vessel. Therefore the crushing and mixing device of the present invention enables taking out the materials in which the entrained moisture therein is dewatered.

In the mixing and melting method of the seventh invention having the above-described construction, in the mixing and melting method for mixing and crushing the cellulose-based material in the mixing vessel by the means of the plurality of blades installed on the rotary shaft which is being rotated by the driving source; the chipped cellulose-based material and the binder which is introduced from the inlet for materials, are mixed and crushed by at least two blades which are installed on the rotary shaft in the arrangement opposing each other in the axial direction of the rotary shaft on the site spaced at the predetermined angle in the circumferential direction thereof as well as being inclined at the angle which reduces each other's opposing space in the rotating direction thereof; the molten binder is impregnated in the cellulose-based material of which the entrained moisture therein is dewatered by the heat generated by shearing, friction and compression of the cellulose-based material in the mixing vessel; and the cellulose-based material is taken out from the mixing vessel after impregnation of the molten binder to the cellulose-based material has finished. Therefore, as the binder is impregnated equally in the cellulose-based material of which the entrained moisture therein is dewatered, the mixing and melting method of the present invention can process the cellulose-based materials without being concerned with regard to the water content thereof, and, if the materials are being chipped or split, in steps of pulverizing, drying, draining and mixing, and pelletizing by one step (only with one mixing and melting device) within a short thermal history, there is little environmental load in reusing the wasted materials as molded materials. It is an object of the present invention to solve problems with production costs and productivity In the mixing and melting method of the eighth invention having the above-described construction according to the seventh invention, the cellulose-based material comprises the woody material and/or the plant material. Therefore, as the binder is impregnated equally in the woody material and/or a plant material of which the entrained moisture therein is dewatered, the mixing and melting method of the present invention can process the woody material and/or a plant material without being concerned with regard to the water content thereof, and, if the materials are being chipped or split, in steps of pulverizing, drying, draining and mixing, and pelletizing by one step (only with one mixing and melting device) within a short thermal history, there is little environmental load in reusing the wasted materials as molded materials. It is an object of the present invention to solve problems with production costs and productivity In the mixing and melting method of the ninth invention having the above-described construction according to the eighth invention, the woody material and/or plant material are respectively the woody waste material and/or the plant-waste material. Therefore, as the binder is impregnated equally in the woody waste material and/or a plant-waste material of which the entrained moisture therein is dewatered, the mixing and melting method of the present invention can process the woody waste material and/or a plant-waste material without being concerned with regard to the water content thereof, and, if the materials are being chipped or split, in steps of pulverizing, drying, draining and mixing, and pelletizing by one step (only with one mixing and melting device) within a short thermal history, there is little environmental load in reusing the wasted materials as molded materials. It is an object of the present invention to solve problems with production costs and productivity In the mixing and melting method of the tenth invention having the above-described construction according to the ninth invention, the rotary shaft is rotated by the motor working as the driving source, with the peripheral velocity of 5 to 50 meters per second at the tip of the blades. Therefore the mixing and melting method of the present invention enables processing steps of pulverizing, drying, draining and mixing, and palletizing in desired condition.

In the mixing and melting method of the eleventh invention having the above-described construction according to the tenth invention, the motor and the rotary shaft are connected not to follow rapid transitional change of rotation. Therefore as the rapid transitional variation of torque load charged on the blades rotating in the mixing vessel is not allowed to act on a spindle of the motor, the mixing and melting method of the present invention has the effect to prolong the motor life.

In the mixing and melting method of the twelfth invention having the above-described construction according to the eleventh invention, the variation of torque load acting on the spindle of the motor is monitored. Therefore the mixing and melting method of the present invention enables to comprehend the condition of pulverizing, drying, draining and mixing, and palletizing in the mixing vessel.

In the mixing and melting method of the thirteenth invention having the above-described construction according to the twelfth invention, when the monitored torque load acting on the spindle of the motor has shifted from rising to reach a maximum value thereof, turning down to reach a minimum value thereof depending on the states of materials which are being mixed, crushed and dried in the mixing vessel, and then the predetermined time has passed after the monitored torque load reaching the minimum value thereof, the cellulose-based material which is being mixed, crushed, dehydrated and impregnated with the binder, is taken out from the outlet of the mixing vessel. Therefore the mixing and melting method of the present invention enables generating the cellulose-based material of which the entrained moisture therein is dewatered.

In the method for molding a cellulose-based material impregnated with a molten binder of the fourteenth invention having the above-described construction, the chipped cellulose-based material and the binder which are being introduced from the inlet for materials, are mixed and crushed by at least two blades installed on the rotary shaft which are situated in the mixing vessel and rotated by the driving source, in the arrangement opposing each other in the axial direction of the rotary shaft on the site spaced at a predetermined angle in the circumferential direction thereof as well as being inclined at the angle which reduces each other's opposing space in the rotating direction thereof; the molten binder is impregnated in the cellulose-based material of which the entrained moisture therein is dewatered by the heat generated by shearing, friction and compression of the cellulose-based material in the mixing vessel; the cellulose-based material is taken out from the mixing vessel after impregnation of the molten binder to the cellulose-based material has finished; and the cellulose-based material impregnated with the molten is taken out from the mixing vessel, and then is molded by heating and pressing. Therefore the present invention enables to obtain a strong molded article of cellulose-based materials impregnated with the molten binder.

In the method for molding a cellulose-based material impregnated with a molten binder of the fifteenth invention having the above-described construction according to the fourteenth invention, molding for the cellulose-based material impregnated with the molten binder is carried out by extrusion molding. Therefore the present invention enables to continuously mold a strong molded article of cellulose-based materials impregnated with the molten binder.

In the method for molding a cellulose-based material impregnated with a molten binder of the sixteenth invention having the above-described construction according to the fifteenth invention, the cellulose-based material is the woody waste material and/or the plant-waste material, Therefore, the present invention enables to continuously mold a strong molded article of the woody waste material and/or the plant-waste material.

BEST MODE FOR CARRYING OUT THE INVENTION

Embodiments of the present invention will now be described with reference to the drawings.

First Embodiment

Figure 1:
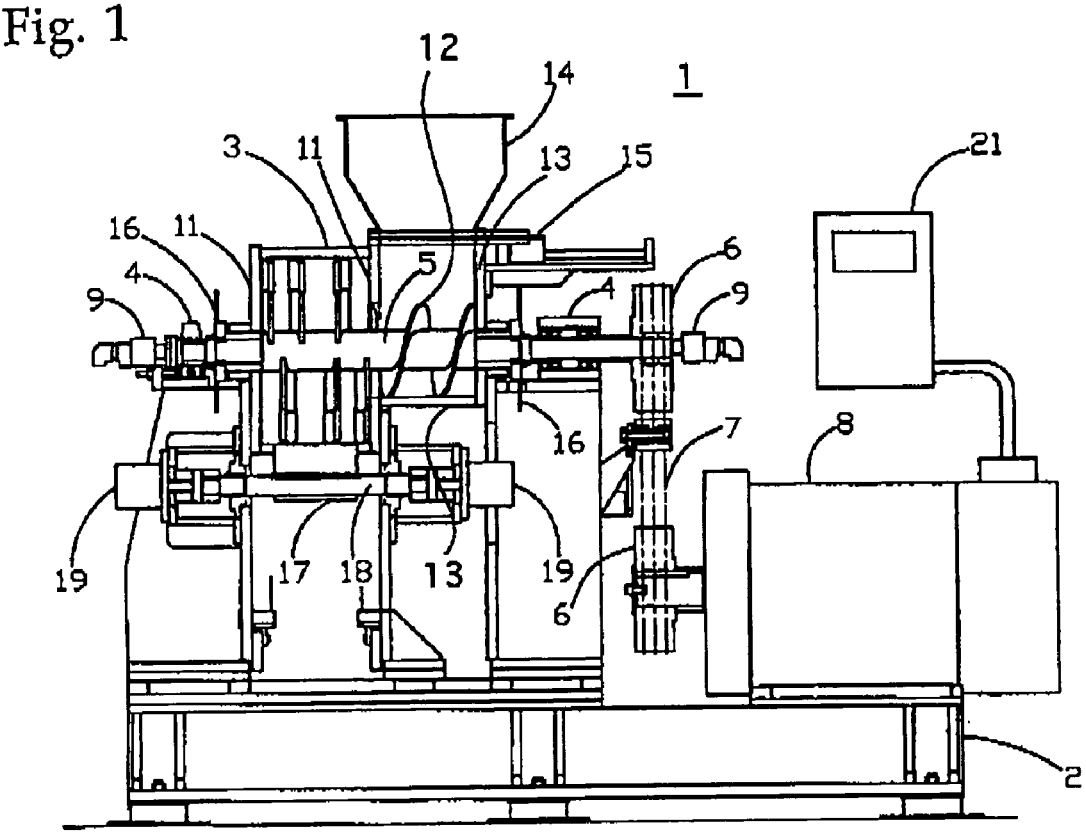
FIG. 1 is a front view showing the mixing and melting device of the embodiments and the example according to the present invention.
Figure 2:
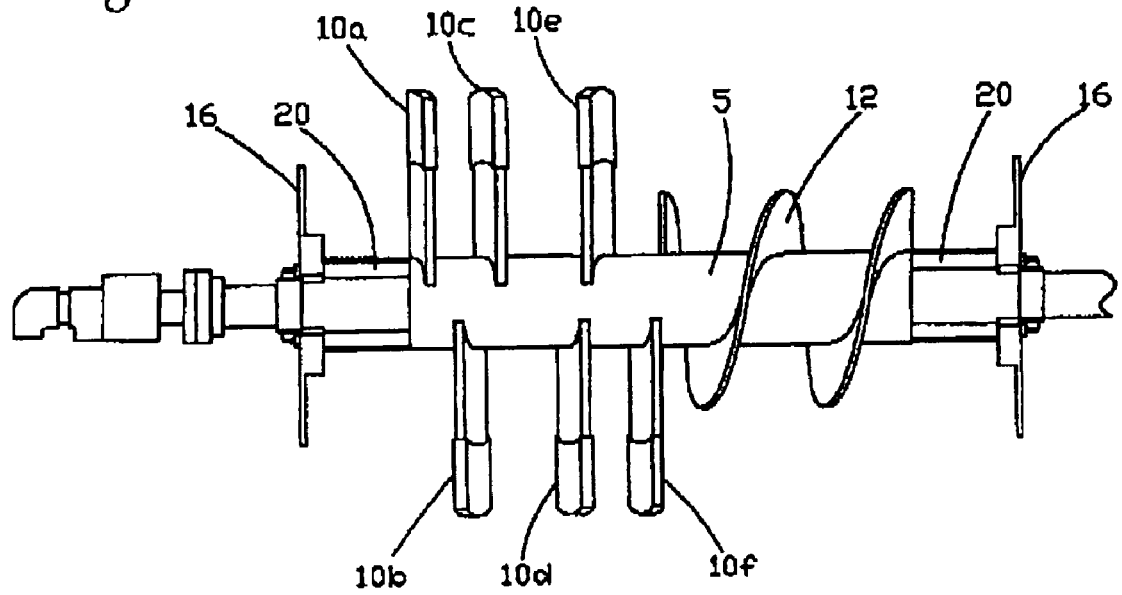
FIG. 2 is a partial enlarged view showing the shaft of the rotary blades of the mixing and melting device of the embodiments and the example according to the present invention.

A crushing and mixing device of a first embodiment of the present invention and a mixing and melting method employing the crushing and mixing device is, as shown in FIG. 1 and FIG. 2, the crushing and mixing device having a mixing vessel 3 in which a plurality of blades 10a to 10f are installed on a rotary shaft 5 which is rotated by a motor 8 working as a driving source and freely rotatably supported, to mix and crush materials; wherein a spiral vane 12 is equipped to supply the materials which are introduced to a rotary shaft corresponding to an inlet for materials, to the mixing vessel; at least two blades of the plurality of blades 10a to 10f are installed on the rotary shaft 5 in an arrangement being inclined at an angle which reduces each other's opposing space in the rotating direction; an outlet 17 is disposed at a side of a wall of the mixing vessel 3 to take out the materials mixed and crushed in the mixing vessel; and the materials are mixed and crushed, and the entrained moisture therein is dewatered in the mixing vessel 3 by the heat generated by actions of shearing, friction and compression.

In the first embodiment of the present invention, the split woody waste materials and plant-waste materials applied as cellulose-based material are supplied together with a binder of thermoplastic resins (such as PPs, PEs or biodegradable resins), a compatibility accelerator (such as reactive polyolefin-based oligomers or maleic anhydride) and the like, to the mixing vessel 3 via the spiral vane 12, and the split woody waste materials and plant-waste materials, and the binder are subjected to repeated collisions at high speed by virtue of high speed rotation of a plurality of blades 10a to 10f which are oppositely installed.

How woody waste materials and plant-waste materials behave under such collision in the mixing vessel 3 has not yet been scientifically clarified; it seems that the materials are converted from the split to the pulverized and then finally to fine powder due to the energy of collision, and the collision energy is also converted to internal energy, resulting in temperature increase of the fine powder itself.

Thermal motion effect (internal frictional heating) is caused at the same time by the action of rotary vane 12 which pressingly strikes and forces ahead the fine powder against an internal surface of the enclosed wall of the mixing vessel 3, and synergistically works with the temperature increase due to internal energy, and a large amount of air simultaneously flows into the material mixing vessel 3 through an aftermentioned groove which is continuously formed on the shaft of the rotary blades for draining components derived from dehydration; all of these actions result in rapid temperature increase (from 60 to over 200° C. in about one or two seconds).

Figure 8:
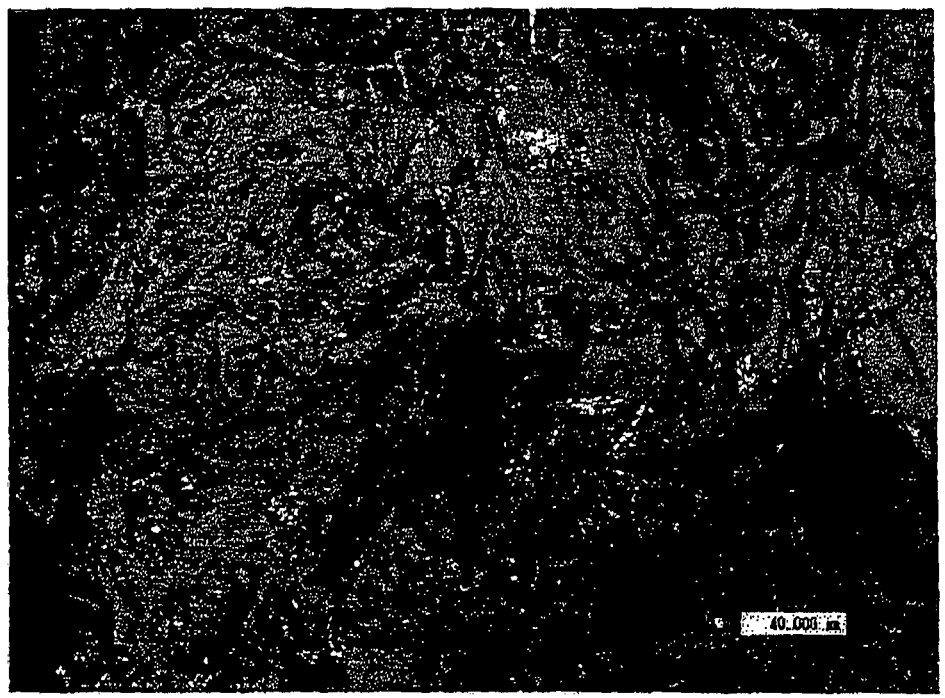
FIG. 8 is a photograph taken by a microscope for the highly filled molding material (woody waste materials (cedar)+ binder) of the Example according to the present invention.

Different from the simple mixing method described in the prior arts, the inside of the mixing vessel 3 instantly becomes a state of high temperature and high pressure; this state eliminates free water existing in the cavities of lumens, intercellular spaces and the like, and bound water contained in cell walls and leaves clearances in wood; then, such clearances are impregnated with a binder of thermoplastic resins (such as PPs, PEs or biodegradable resins) and a compatibility accelerator (such as reactive polyolefin-based oligomers or maleic anhydride) with mediation of lignin which occupies a larger content in wood after cellulose; and such impregnatation allows cellulose constituting wood to be integrated with a uniform and strong binding force which has never been found in the simple mixing method (refer to a photo of FIG. 8). It is understood that, since the lignin is a natural polymer having a three dimensional network structure including three monoglynols and has an affinity to binder polymer, the molten binder is impregnated in the dehydrated cellulose component.

The fine split of which the dehydrated cellulose component is impregnated with a molten binder is taken out from the mixing vessel 3; such a fine split enables to produce highly filled molding materials in which woody waste materials and plant-waste materials are contained in a ratio of 80 to 90% by weight, to simplify production steps and to gain great advantages in production cost and productivity.

Second Embodiment

Figure 6:
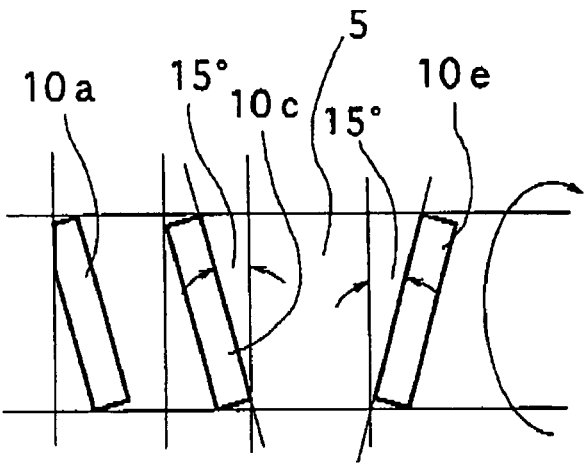
FIG. 6 is a partial enlarged view showing the disposal of the six blade members with respect to the rotary shaft of the embodiments and the example according to the present invention.
Figure 6:
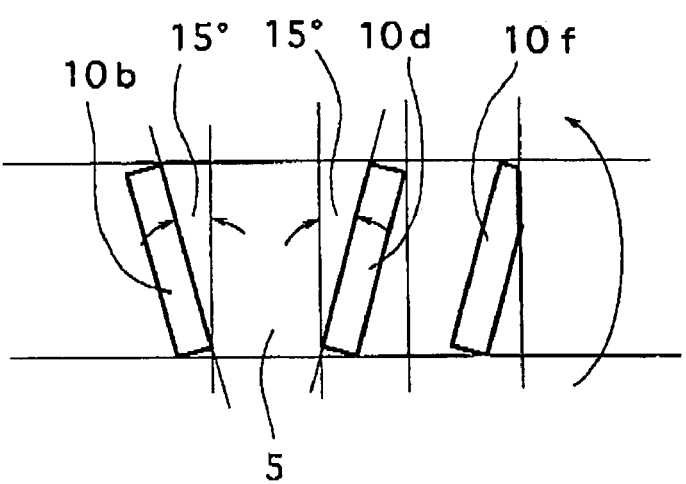

A crushing and mixing device in a second embodiment of the present invention is the crushing and mixing device, as shown in FIG. 1 and FIG. 6, having a mixing vessel 3 in which a plurality of blades 10a to 10f are installed on a rotary shaft 5 which is rotated by a driving source and freely rotatably supported, to mix and crush materials; wherein a spiral vane 12 is equipped to supply the woody materials and/or plant materials and binders which are introduced to a rotary shaft 5 corresponding to an inlet 14 for materials, to the mixing vessel 3; the plurality of blades are constituted by a plurality of blades which are installed on the rotary shaft in an arrangement opposing each other in the axial direction of the rotary shaft on a site spaced at a predetermined angle in the circumferential direction thereof as well as being inclined at an angle which reduces each other's opposing space in the rotating direction; the inclined angle of the blades to the rotary shaft is unchanged between a base of the blade affixed on the rotary shaft and a tip of its radial direction; an outlet 17 is disposed at a side of a wall of the mixing vessel 3 to take out the materials mixed and crushed in the mixing vessel; the materials are mixed and crushed, and the entrained moisture therein is dewatered by the heat generated by actions of shearing, friction and compression; and a molten binder described above is impregnated in the woody material and/or plant material of which the contained water is eliminated.

The crushing and mixing device of the second embodiment of the present invention is specifically explained by referring to the drawings. In FIG. 1, a mixing and melting device 1 is exhibited as an example. In the mixing and melting device 1, the cylindrical mixing vessel 3 situated horizontally and a supplying vessel 13 equipped with the inlet 14 for materials and the spiral vane 12, are installed on a machine base 2 being supported by a plurality of legs.

The rotary blade shaft 5 is horizontally supported by bearings 4 and 4 situated on the respective legs at both ends, the blade shaft 5 is disposed to coaxially penetrate the center of the mixing vessel 3, and one end of the rotary blade shaft 5 (the right end in FIG. 1) is connected to the motor 8 as a driving force via a pulley 6 and a V-shape belt 7.

The rotary blade shaft 5 is constituted of a hollow pipe having a small diameter hole in the center of axis thereof which is prepared for supplying cooling water, and of rotary joints 9 installed on the both ends thereof for supplying cooling water in the rotary blade shaft 5 in its axial direction through the rotary joints 9.

On an outer periphery of the rotary blade shaft 5 disposed penetrating the mixing vessel 3, as shown in FIG. 2, a total of 6 blades 10a to 10f respectively having a rectangular cross-section shape as well as a rectangular whole shape are projected in an arrangement opposing each other in the axial direction on a site spaced at 180 degrees in the circumferential direction of the rotary shaft. Regarding the thickness of individual blades 10a to 10f, as shown in FIG. 2, an approximate 40 percent portion thereof at an outer periphery is thicker than the remaining portion at an inner periphery in order to effectively mix, crush and melt materials.

The blades 10a and 10f arranged at both ends in the axial direction among all the blades are affixed on the periphery of the rotary blade shaft 5 by being inclined at 15 degrees from the tip to the base thereof, in order for a leading edge thereof to slidingly contact with almost no clearance to the inner surfaces of vertical walls 11 and 11 disposed at both ends of the mixing vessel 3 while the blades rotate in the clockwise direction as seen from the right side in FIG. 1.

The four blades 10b, 10c, 10d and 10e arranged in the middle part among all the blades are respectively affixed on the periphery of the rotary blade shaft 5 in a zigzag arrangement by being respectively inclined at 15 degrees from the tip to the base thereof, in order for a leading edge thereof to face either side of both ends of the mixing vessel 3 while rotating. Namely, sets of blades 10b and 10d, and 10c and 10e of the four blades are, as shown in FIG. 2 and FIG. 6, installed on the rotary shaft 5 in an arrangement that the blades of each set oppose each other in the axial direction at the inclined angle of 15 degrees (an angle to the circumferential direction) which reduces each other's opposing space in the rotating direction.

A motor side of both end walls 11 of the mixing vessel 3 is an inlet for materials of mixing vessel 3 which is opened at one end wall of the mixing vessel 3, reference numeral 12 denotes a spiral screw to feed materials which is equipped on the outer periphery of the rotary blade shaft 5, reference numeral 13 denotes a material feeding box enclosing the feeding screw 12, reference numeral 14 denotes a hopper mounted above the material feeding box 13, and the hopper 14 has an openable/closable shutter 15 which can be airtightly closed while materials are being mixed, crushed and melted after being introduced to the hopper 14. A pair 16 and 16, at the both ends, of balance wheels are affixed to the rotary blade shaft 5 for gaining smooth rotation.

A continuous water conduit formed in the peripheral wall of mixing vessel 3 is constituted to cool down the mixing vessel 3 by circulating cooling water. Reference numeral 17 denotes a lid of an outlet disposed at the bottom wall of mixing vessel 3 to take out pelletized materials; and the outlet lid 17 is rotatably supported by an axis 18 connected to rotary cylinders 19 and 19, and constituted openably or closably.

Collars 20 and 20 at both sides shown in FIG. 2 are applied to stream air into the mixing vessel 3, and each of the continuous grooves at both ends is constituted with a spiral groove twisted right or left in order to stream air into the mixing vessel 3 by the rotation of rotary blade shaft 5.

Reference numeral 21 denotes a control panel connected to the motor 8 via a connecting cable, and is constituted such that torque load of the spindle of the motor 8 is converted to an electrical signal to be continuously transmitted from the motor 8 to the control panel 21.

An opening/closing controlling unit is prepared to take out mixed and crushed materials by controlling the opening/closing timing of the opening/closing member 17 disposed at the outlet of the mixing vessel 3, depending on the variation of torque load acting on the spindle of the motor 8; such torque change corresponds to the states of materials which are being mixed, crushed and dried in the mixing vessel 3.

The mixing and melting methods of a second embodiment of the present invention which employ the crushing and mixing devices having the above-described construction, is a mixing and melting method for mixing and crushing woody materials and/or plant materials as a cellulose-based material in a mixing vessel by means of the plurality of blades 10a to 10f installed on the rotary shaft 5 which is rotated by the motor 8 as a driving source; wherein woody materials and/or plant materials as chipped cellulose-based materials and a binder which are introduced from the inlet for materials, are mixed and crushed by at least two blades which are opposing each other in the axial direction on a site spaced at a predetermined angle in the circumferential direction of the rotary shaft 5 in the mixing vessel 3 as well as being installed on the rotary shaft 5 at an inclined angle which reduces each other's opposing space in the rotating direction thereof; a molten binder is impregnated in the cellulose-based materials of which the contained water is eliminated by the heat generated by shearing, friction and compression of the cellulose-based materials in the mixing vessel 3; and the woody materials and/or plant materials as the cellulose-based materials are taken out from the mixing vessel after impregnation of the molten binder having finished.

The cellulose-based materials are the woody materials and/or the plant-materials. And the woody materials and/or the plant materials may be recycled by using the woody waste materials and/or the plant-waste materials.

The woody waste materials and/or the plant-waste materials are the cellulose-based materials without being concerned with regard to the water content thereof, and, if the materials are being chipped or split, wherein such cellulose-based materials include woody materials and woody waste materials, and plant materials and plant-waste materials; the woody materials and woody waste materials include, for example, pruned branches and leaves of trees planted as shade trees such as horse chestnut, ginkgo trees, Chinese parasol, cherry tree, willow and poplar; pruned branches and leaves of cedar, white cedar, pine and Japanese larch; thinned woods of cedar, white cedar, pine and Japanese larch; barks of cedar, white cedar, pine and Japanese larch; chips and sawdust of cedar, white cedar and pine which are by-produced in lumber-mills; and laminated woods; and the plant materials and plant-waste materials include, for example, stems and leaves of wheat, used tea leaves and chaffs.

Figure 7:
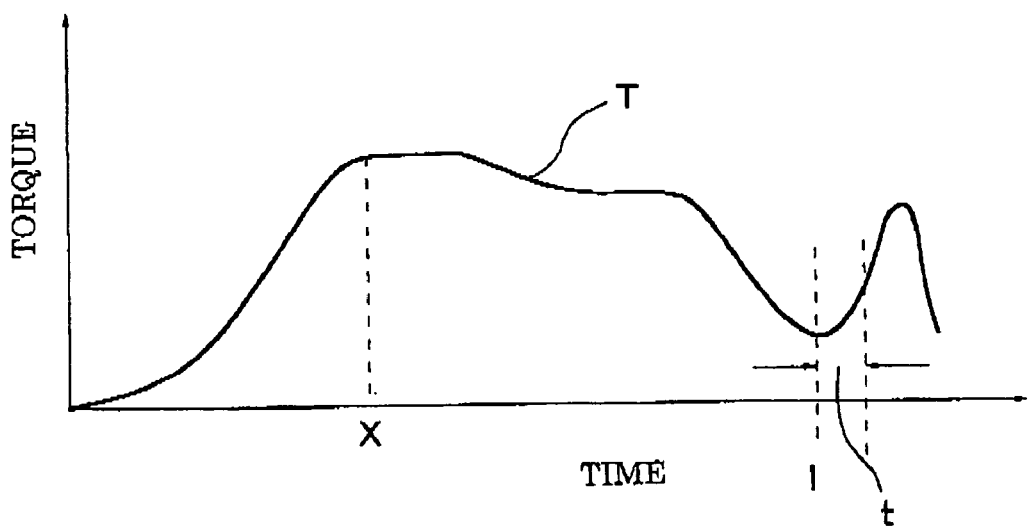
FIG. 7 is a diagrammatic view showing the variation of the torque load acting on the spindle of the motor with respect to the state of materials which are being mixed, crushed, dried and melted in the mixing vessel of the embodiments and the example according to the present invention.

The rotary shaft is rotated by the motor 8 working as the driving source, with a peripheral velocity of 5 to 50 meters per second at the tip of the blades 10a to 10f; the motor 8 and the rotary shaft 5 are connected not to follow rapid transitional change of rotation; a variation of torque load acting on the spindle of the motor 8 is monitored; and, when the monitored torque load T acting on the spindle of the motor 8 has, as shown in FIG. 7, increased to reach maximum value X and then turned down to reach minimum value I depending on the state of materials which are being mixed, crushed and dried in the mixing vessel 3, and when a predetermined time t has passed after the monitored torque load T reaching the minimum value I thereof, the woody waste materials and/or plant-waste materials as the cellulose-based materials mixed, crushed, dehydrated and impregnated with the binder, are taken out from the outlet 17 of the mixing vessel 3.

The mixing and melting device and the mixing and melting methods of the second embodiment of the present invention, thus, reuse woody waste materials and/or plant-waste materials, and provide raw materials for producing more woodlike moldings having characteristics of a woody feeling, woody fragrance, little generation of static electricity, little degradation on physical properties after absorption of ultraviolet rays, absorbing and desorbing moisture and the like.

In addition, this device and method can apply conventional molding devices, molds and wood working machines for secondary fabrication as themselves without any requirement of special facilities, and process woody waste materials and plant-waste materials in a short time under one step involving all steps of splitting, pulverizing, drying, melting and mixing and pelletizing, that is, by one mixing and melting device, without application of external heating; this allows to drastically reduce production costs and to produce more environmentally friendly moldings by applying biodegradable resins for binders.

This device and method, moreover, can crush off-specification products generated in production procedures, and utilize 100% for molding; this allows repeated reuse as well as reusing woody waste materials and plant-waste materials at a high ratio, and results in advantages regarding effectively utilizing resources.

The second embodiment of the present invention utilizes the fact that woody materials subjected to heating treatment in the mixing vessel 3 develop self-adhesibility and thermal fluidity; that is, woody materials heated by steam in the mixing vessel 3 are once dried by being subjected to depressurization by instantly opening the opening/closing member 17, and then such a steam-exploded product is heated and pressed by a hot pressing or the like to mold a molding.

It is known that woody materials treated by steam heating retain adhesive components, and can be molded without adhesives and flown by being heated and pressed. Strong plastic-like moldings can be produced by solely applying woody materials as raw materials.

Example

Figure 3:
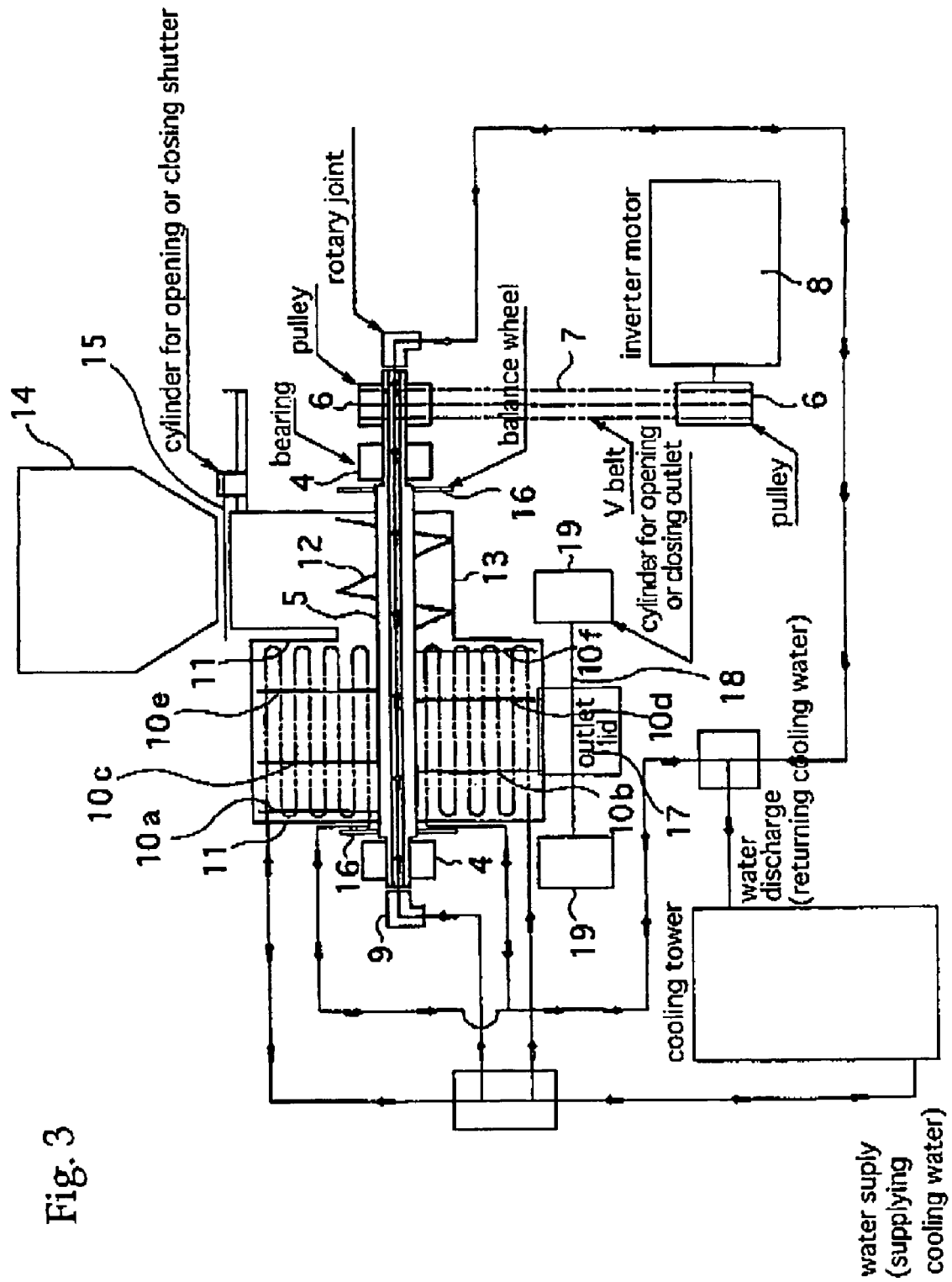
FIG. 3 is a skeleton block diagram showing the whole system of the mixing and melting device of the embodiments and the example according to the present invention.
Figure 4:
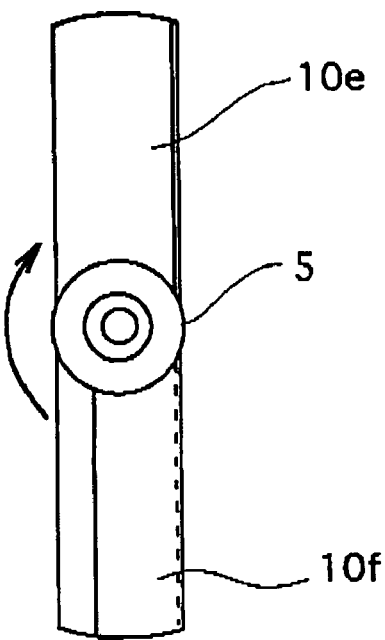
FIG. 4 is a partial enlarged side view showing the relationship between the blade member and the rotary shaft of the rotary blade shaft of the embodiments and the example according to the present invention.
Figure 5:
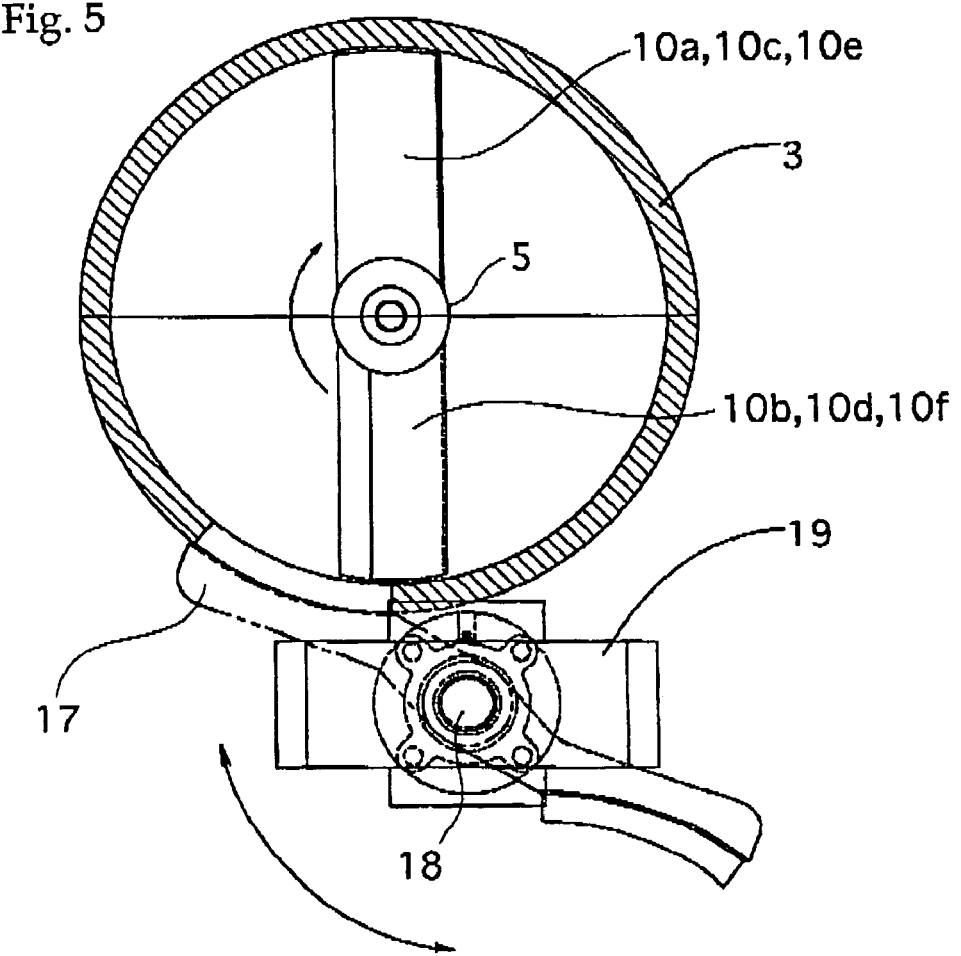
FIG. 5 is a cross sectional view showing the freely openable and closable opening/closing member disposed at the outlet of the mixing vessel of the embodiments and the example according to the present invention.

In the mixing and melting device 1 and the mixing and melting method of the Example, as shown in FIG. 1 and FIG. 3, the rotary blade shaft 5 and the mixing vessel 3 are cooled by respectively circulating cooling water through the inside of the rotary blade shaft 5 in its axial direction and through the loop wound like headband in the wall of the mixing vessel 3.

The blades 10a to 10f are rotated by the motor 8 via the rotary blade shaft 5. When peripheral velocity of blades 10a to 10f reach 5 meters per second, the split woody waste material (cedar: 85% by weight) and the binder (PP: 12% by weight, maleic anhydride: 3%) which have been weighted in advance and introduced to the hopper 14, are supplied to the material feeding box 13 by opening the shutter 15, followed by the shutter 15 being closed. The materials are forced into the mixing vessel 3 by rotation of the feeding screw 12.

After the hopper 14 is emptied, the shutter 15 is closed and the rotation of the motor 8 is increased up to 30 meters per second of the peripheral velocity of blades 10a to 10f, and then the peripheral velocity of blades 10a to 10f is maintained for about 40 seconds at 30 meters per second.

For this duration, the materials are processed by a splitting step, a pulverizing step and then a powdering step, and the water contained in the materials is eliminated in these steps so that the resulting powder becomes almost completely a dried state; and the temperature in the mixing vessel 3 quickly rises from 60° C. to over 200° C. due to the synergistic effect of internal energy and internal frictional heating.

At this time, the inside of the mixing vessel 3 instantly becomes a state of high temperature and high pressure; this allows the binder to instantly melt and mix in the clearances left by elimination of free water existing in the cavities of lumens, intercellular spaces and the like, and bound water contained in cell walls, and then to uniformly and strongly combine with cellulose and the like constituting wood.

When the materials are melted and mixed, a huge torque load is instantly rendered to the blades 10a to 10f and the rotary blade shaft 5. In this Example, the torque load acting on the motor 8 reaches approximately 130% by load value. Where the blades 10a to 10f and the rotary blade shaft 5 which are rotating at a high speed have fallen in a braked state, a V-shape belt 7 which connects a pulley 6 on the side of the rotary blade shaft 5 and a pulley 6 on the side of the motor 8 is allowed to slip so as not to transmit rapid torque load change to the spindle of the motor 8.

The variation of torque load acting on the motor 8 is converted to an electric signal to be transmitted to the control panel 21, and then matched with a torque load data previously stored in the control panel 21 to read a finishing period of melting and mixing; when being read, the rotary cylinders 19 and 19 are driven under the blades 10a to 10f rotating at a high speed of 30 meters per second at their peripheral velocity on the tip of the blades, to open the outlet lid 17 which is connected via the axis 18, and then a highly filled molding material of cedar which is dehydrated, impregnated with binders and pelletized, is taken out.

Since values of torque load change on the motor 8 differ depending on the kinds of woody waste materials and plant-waste materials being applied, weights of woody waste materials and plant-waste materials introduced to the mixing vessel 3, the mixing and melting device 1 must be manually operated at the first operation to read values of torque load change of the motor 8 and then to store these values in the control panel 21 as a base data, then opening/closing of the outlet lid 17 is controlled according to such previously stored data.

The extrusion molding is carried out by employing the highly filled molding material of cedar prepared in the Example. The molding obtained by extrusion molding is an example composed of the woody waste material (cedar: 85% by weight) and the binder (PP: 12% by weight, maleic anhydride: 3%), and the measurement results of the sample measured regarding respective test items are exhibited in Table 1.

For comparison, the measurement results tested regarding cedar wood itself, Comparative Example 1 (woody waste material 55%, used PP material 30%, additives and others 15%), Comparative Example 2 (medium density fiberboard composed of wood fiber sprayed with adhesive and hot-pressed) and Comparative Example 3 (wood powder 55%, resin 45%), are also exhibited in Table 1.

TABLE 1

[Comparison of Basic Physical Properties]
Values of Example apply values tested by Aichi Industrial Technology Institute.

| | | | Measured Value | | | | |
|---|---|---|---|---|---|---|---|
| Test Item | Test method | measure | Example | Comparative Example 1 | ceder | Comparative Example 2 | Comparative Example 3 |
| Density | JIS Z 2101 | g/cm$^3$ | 1.17 | 1.21 | 0.38 | 0.35~0.8 | 1.06 |
| Water Content | JIS Z 2101 | % | 0.98 | — | — | 5~13 | 0.85 |
| Bending Strength | JIS Z 2101 | kg/cm$^2$ | 335 | 390 | 650 | 300 | 237.4 |
| Bending Young's modulus | JIS Z 2101 | kg/cm$^2$ | 55400 | — | 75000 | 30000 | 25100 |
| Absorbed energy in Impact Bending | JIS Z 2101 | kg · m/cm$^2$ | 0.01 | — | 0.35 | — | — |
| Hardness | JIS Z 2101 | kg/mm$^2$ | 6.5 | — | 3.2 | — | — |
| Longitudinal Compression Strength | JIS Z 2101 | kg/cm$^2$ | 424 | — | 350 | — | — |
| 5% Partial Comparison | JIS Z 2101 | kg/cm$^2$ | 403 | — | 250 | — | — |
| Abrasion Loss | JIS Z 2101 | mm | 0.051 | — | 250 | — | — |
| Retaining Strength of Wood Screw | JIS A 5905 | N | 1836 | 3432 | 2059 | 500 | 1361 |
| Percentage of Water Absorption | JIS A 5905 | % | 2.29 | 0.6 | 20.6 | 17 | 1.34 |

Example: Flooring-aviton molding i.e. flooring molding used aviton material such as lauan (ceder wood 85% + PP 12% + maleic anhydride 3%)
Comparative Example 1: (woody waste material (55%), used PP material (12%), additives and others (15%))
Comparative Example 2: Medium density fiberboard (a material composed of wood fiber sprayed with adhesive and
Comparative Example 3: (wood powder (55%) + resin (45%))

It is understood in Table 1 that the hardness of the Example having employed cedar waste is twice as much as that of the cedar wood itself, its longitudinal compression strength is more than 120%, and its abrasion loss is far smaller.

The bending Young's modulus of the Example is roughly twice as much as that of Comparative Example 2 and 3, and its bending strength is respectively more than 110% and 140% compared with respective Comparative Example 2 and 3.

A photograph taken by a microscope for the highly filled molding material (woody waste materials (cedar)+binder) of the Example is exhibited in FIG. 8. It is understood that alignment of tracheids (cells) is destroyed by thermal flow and the binder is impregnated.

Figure 9:
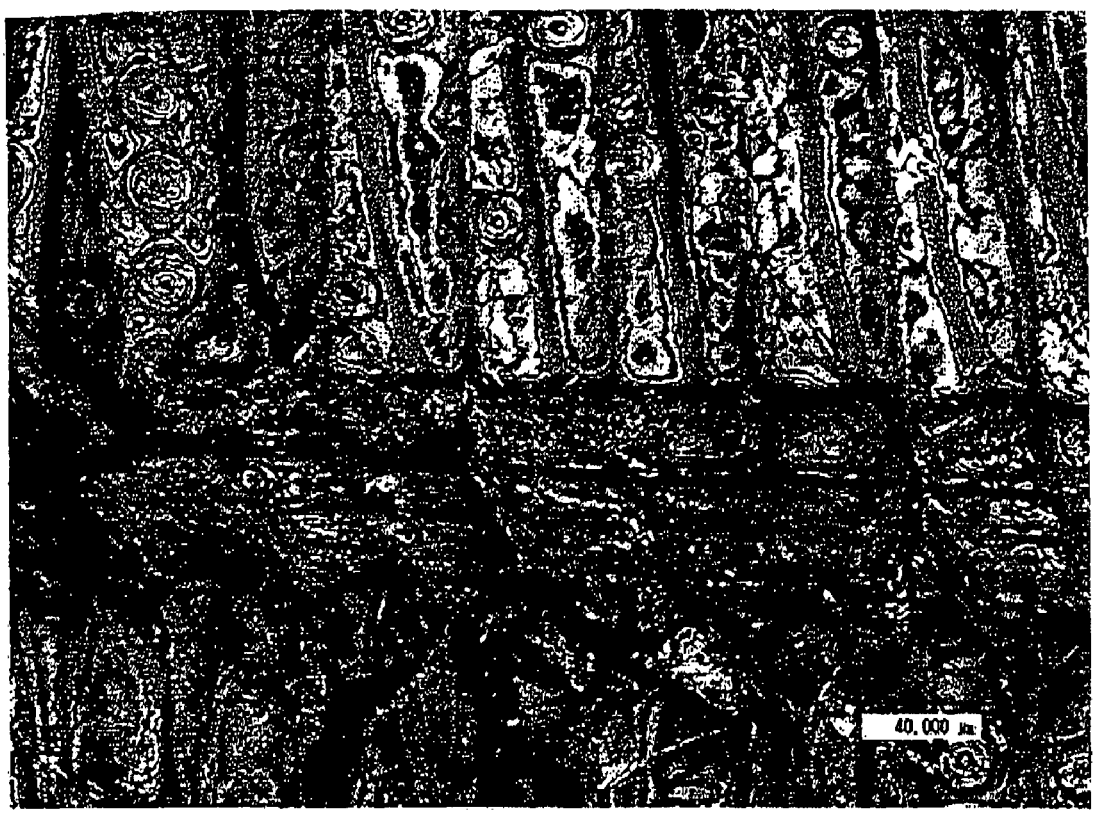
FIG. 9 is a photograph taken by a microscope for the split slice of a woody waste material (cedar) for comparison according to the example of the present invention.

A photograph taken by a microscope for the split slice of a woody waste material (cedar) applied in the Example is exhibited in FIG. 9. It is understood that tracheids (cells) are orderly and aligned in radially extending directions. The tracheids are functioning to pass water in wood as well as to mechanically support a wood body.

The above-described embodiments of the present invention, as herein disclosed, are taken as some embodiments for explaining the present invention. It is to be understood that the present invention should not be restricted by these embodiments and any modifications and additions are possible so far as they are not beyond the technical idea or principle, which would be considerable by a person with ordinary skill in the art, based on description of the scope of the patent claims, specification and figures.

Figure 10:
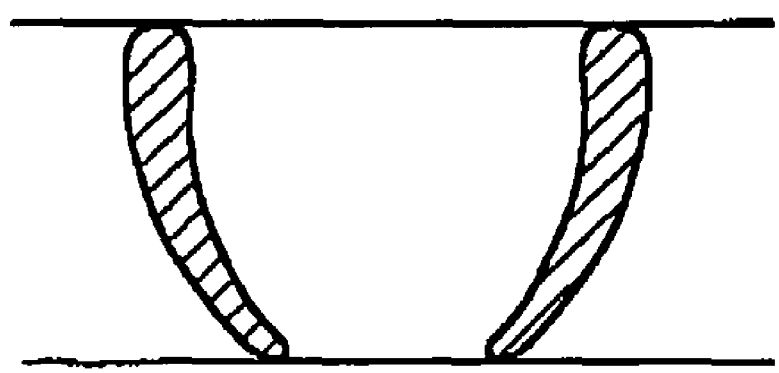
FIG. 10 is a partial enlarged explanation view showing the examples of the blade members of the other examples according to the present invention.
Figure 10:
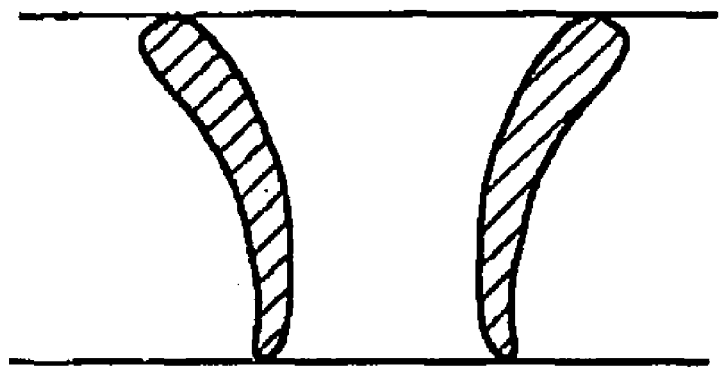

In the foregoing embodiments and example, the blade explained as an example was affixed at the inclined angle of 15 degrees and had a rectangular cross-section shape. The present invention, however, is not limited thereto; for example, the inclined angle may, if necessary, be set to other than 15 degrees, and embodiments may, if necessary, apply blade members having a concave or convex airfoil cross-section shape in middle part thereof as shown in FIGS. 10A and 10B.

In the foregoing embodiments and example, an example to open or close the outlet lid of the mixing vessel by the rotary cylinder was explained. The present invention, however, is not limited thereto; for example, embodiments may, if necessary, apply a piston-cylinder type actuator of which the piston linearly moves in its cylinder to open or close the outlet lid.

In the foregoing embodiments and example, explained was an example to detect the state of materials being mixed, crushed and melted in the mixing vessel by way of monitoring torque load acting on the motor spindle in view of protecting the motor spindle. The present invention, however, is not limited thereto; embodiments may, if necessary, apply ways to detect, for example, temperature in the mixing vessel, distortion of the mixing vessel or any other physical quantities representing the state of materials being mixed, crushed and melted in the mixing vessel.

INDUSTRIAL APPLICABILITY

A crushing and mixing device and a mixing and melting method attained by the crushing and mixing device having a mixing vessel in which a plurality of blades are installed on a rotary shaft which is rotated by a motor as a driving source and freely rotatably supported, to mix and crush materials, and a mixing and melting method applying thereof; wherein a spiral vane is equipped to supply the materials which are introduced to a rotary shaft corresponding to an inlet for materials, to the mixing vessel; at least two blades of the plurality of blades are installed on the rotary shaft at an inclined angle which reduces each other's opposing space in the rotating direction; an outlet is disposed at a side of a wall of the mixing vessel to take out the materials when the mixed and crushed material reaches a predetermined state; the materials are mixed and crushed in the mixing vessel, and the entrained moisture therein is dewatered by the heat generated by actions of shearing, friction and compression; and a molten binder is impregnated in the dehydrated materials. This device and method provide methods for utilizing or reusing materials which are problematic for conventional methods in terms of cost and productivity, the materials such as chipped woody waste materials or woody waste materials like pruned branches and leaves of trees, and plant materials and plant-waste materials like stems and leaves of wheat, and are suitable for applications to enhance utilization of wasted materials by improving the filling ratio thereof and to promote reuse of the wasted materials.

The invention claimed is:

1. A crushing and mixing device having a mixing vessel in which a plurality of blades are installed on a rotary shaft which is being rotated by a driving source and freely rotatably supported, to mix and crush cellulose-based materials and a binder; wherein a spiral vane is equipped to supply said materials which are being introduced to the rotary shaft corresponding to an inlet for materials, to said mixing vessel;

said plurality of blades are constituted by at least two blades which are installed on said rotary shaft in an arrangement opposing each other in the axial direction of said rotary shaft on a site spaced at a predetermined angle in a circumferential direction thereof as well as being inclined at an angle which reduces each other's opposing space in the rotating direction thereof;

said inclined angle of said blades to said rotary shaft is unchanged between a base of each said blade affixed on said rotary shaft and a tip thereof in its radial direction;

an outlet is disposed at a side of a wall of said mixing vessel to take out said materials mixed and crushed in said mixing vessel;

said rotary shaft being provided in said mixing vessel and said rotary shaft including one groove formed thereon that is constituted to enable to drain components derived from dehydration due to the heat generated by shearing, friction and compression of said materials in said mixing vessel; and a control means for controlling an opening/closing member disposed at said outlet of said mixing vessel for taking out said mixed and crushed materials, wherein said control means controls opening or closing of said opening/closing member based on a variation of a torque load which acts on a spindle of a motor as said driving source depending on the state of said materials which are being mixed, crushed and dried in said mixing vessel.

2. A crushing and mixing device according to claim 1, wherein each said blade comprises a rectangular flat plate member in which an outer periphery of said rectangular flat plate member is thicker than an inner periphery thereof.

3. A crushing and mixing device according to claim 2, wherein the driving source comprises a motor which is connected to said rotary shaft via a rotation transmitting means comprising belts or other elements to transmit rotation thereof which is allowed to slip so as not to transmit rapid torque load change of said motor.

4. A crushing and mixing device according to claim 3, wherein said device has a cooling device which supplies a cooling medium from one end of the rotary shaft to the opposite end thereof, and circulates the cooling medium in said wall of the mixing vessel.

5. A crushing and mixing device according to claim 4, wherein said rotary shaft further including another groove which is formed on the rotary shaft at one of support members in said mixing vessel, to communicate respective both ends of the support member in the axial direction, and is constituted to enable to supply an air stream into said mixing vessel.

6. A crushing and mixing device according to claim 5, wherein said device has an opening/closing controlling unit to control an opening/closing member disposed at said outlet of said mixing vessel for taking out said mixed and crushed materials, wherein said unit controls opening or closing of said member based on a variation of a torque load which acts on a spindle of said motor depending on the state of said materials which are being mixed, crushed and dried in said mixing vessel.

7. A crushing and mixing device according to claim 1, wherein said cellulose-based material is a chipped cellulose-based material and the molten binder is impregnated with mediation of the lignin in clearances of said crushed cellulose-based material in which free water and bound water is left by dewatering in said mixing vessel.

8. A crushing and mixing device according to claim 7, wherein when said molten binder is impregnated in the cellulose-based material of which a entrained moisture is dewatered by the heat generated by shearing, friction and compression of the cellulose-based material in said mixing vessel, said outlet is opened to take out the cellulose-based material.

9. A crushing and mixing device according to claim 8, wherein the cellulose-based material comprises a woody material and/or plant material, and the binder comprises thermoplastic resins.

10. A crushing and mixing device according to claim 9, wherein the woody material and/or plant material are respectively a woody waste material and/or a plant-waste material.

11. A crushing and mixing device according to claim 10, wherein said rotary shaft is rotated by said motor working as said driving source, with a peripheral velocity of 5 to 50 meters per second at a tip of said blades.

12. A crushing and mixing device according to claim 11, wherein said motor and said rotary shaft are connected by a rotation transmitting means not to follow rapid transitional change of rotation.

13. A crushing and mixing device according to claim 12, wherein a variation of torque load acting on said rotation transmitting means of said motor is monitored.

14. A crushing and mixing device according to claim 13, wherein when the monitored torque load acting on said spindle of said motor has shifted from rising to reach a maximum value thereof, turning down to reach a minimum value thereof depending on the states of materials which are being mixed, crushed and dried in said mixing vessel, and then the monitored torque is risen from the minimum value thereof, the cellulose-based material which is being mixed, crushed, dehydrated and impregnated with the binder, is taken out from said outlet of said mixing vessel.

15. A crushing and mixing device according to claim 14, wherein when a predetermined time has passed after the monitored torque load reaching the minimum value thereof, the cellulose-based material which is being mixed, crushed, dehydrated and impregnated with the binder, is taken out from said outlet of said mixing vessel.

* * * * *